(12) United States Patent
Geiger

(10) Patent No.: US 6,602,368 B2
(45) Date of Patent: Aug. 5, 2003

(54) METHOD OF MAKING A FUSER ROLL

(75) Inventor: Martin Geiger, Morton, PA (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 143 days.

(21) Appl. No.: 09/789,323

(22) Filed: Feb. 21, 2001

(65) Prior Publication Data

US 2002/0112812 A1 Aug. 22, 2002

(51) Int. Cl.$^7$ ............................................... B32B 1/08
(52) U.S. Cl. ..................... 156/86; 156/285; 156/294; 29/895.212
(58) Field of Search ..................... 156/86, 285, 294, 156/303.1, 308.2; 29/895.21, 895.212

(56) References Cited

U.S. PATENT DOCUMENTS

| | | | | |
|---|---|---|---|---|
| 3,812,562 A | * | 5/1974 | Lovett | 29/895.21 |
| 4,188,423 A | | 2/1980 | Swift | 427/444 |
| 4,258,089 A | | 3/1981 | Anderson et al. | 427/318 |
| 4,381,961 A | * | 5/1983 | van der Velden | 156/215 |
| 5,953,992 A | * | 9/1999 | Calloway | 29/895.21 |
| 6,117,257 A | * | 9/2000 | Takahashi et al. | 156/86 |
| 6,141,873 A | * | 11/2000 | DelRosario et al. | 29/895.211 |

* cited by examiner

*Primary Examiner*—Jeff H. Aftergut
*Assistant Examiner*—Todd J. Kilkenny
(74) *Attorney, Agent, or Firm*—Jeffrey C. Lew

(57) ABSTRACT

A method of coating core having a metal surface with a uniform thickness, smooth, thin layer of fluorinated polymer calls for inserting the core into a sleeve of the polymer. The sleeve has an inner diameter slightly smaller than the outer diameter of the core so that the sleeve stretches to form a skin-tight fit over the core upon insertion. The assembly of sleeve and core is then subjected, in sequence, to aging under vacuum at a temperature below the softening point of the polymer prior, heating to a temperature above the softening point, and cooling below the softening point to thermally bond the fluorinated polymer to the metal surface. A firm bond is achieved without additional adhesive components or etching of the surface. A fuser roll for suitable for electrophotographic copy machine service can be prepared by this method without the need for a separate, post-bonding burnishing step to smooth the exposed surface of the fluorinated polymer layer.

15 Claims, 3 Drawing Sheets

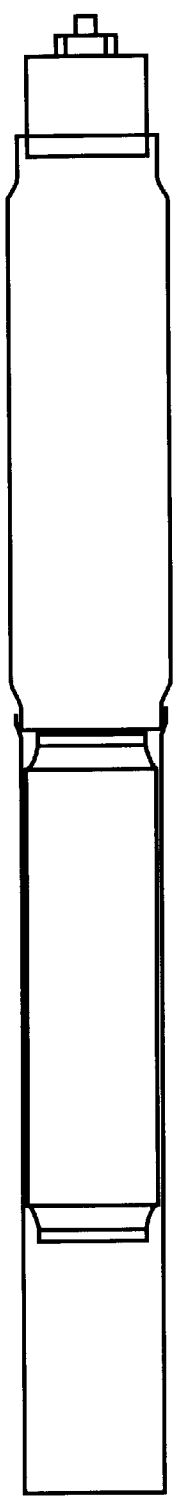
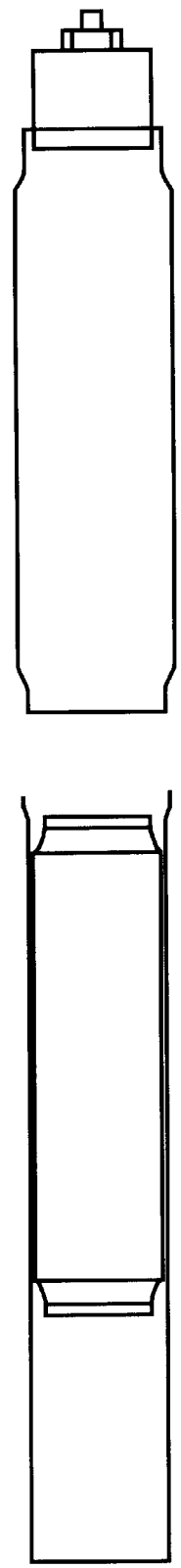
Fig. 3C                    Fig. 3D

METHOD OF MAKING A FUSER ROLL

FIELD OF THE INVENTION

This invention relates to a method of coating a metal object with a fluorinated polymer, and more specifically, it relates to thermally bonding a toner transfer-resistant fluorinated polymer layer onto metal fuser rolls for electrophotographic copy machines.

BACKGROUND AND SUMMARY OF THE INVENTION

In the process of electrophotographic copying a light image of an original to be copied is typically recorded in the form of a latent electrostatic image upon a photosensitive member with subsequent rendering of the latent image visible by the application of electroscopic particles, commonly referred to as toner. The visual toner image can be either fixed directly upon the photosensitive member or transferred from the member to another support, such as a sheet of plain paper, with subsequent affixing of the image thereto. Toners are well known in the art and may be of various types.

In order to affix or fuse electroscopic toner material onto a support surface permanently by heat, it is necessary to elevate the temperature of the toner material to a point at which the constituents of the toner material coalesce and become tacky. This action causes the toner to flow to some extent into the fibers or pores of support sheets or members or otherwise upon the surface thereof. Thereafter, as the toner material cools, it solidifies and becomes bonded firmly to the support in the well known manner.

Several approaches to thermal fusing of electroscopic toner images onto a support have been described in the prior art and include providing the concomitant application of heat and pressure, as by a roll pair maintained in pressure contact, a flat or curved plate member in the pressure contact with a roll, a belt member in pressure contact with a roll, and the like. Heat may be applied by heating one or both of the rolls, plate members or belt members. The fusing of the toner takes place when the proper combination of heat, pressure and contact time are provided, the balancing of these parameters being well known in the art and varying according to various factors which must be independently determined for each particular situation.

During operation of a typical system for thermal fusing of electroscopic toner images onto a support in which at least one fuser member, such as a fuser roll, plate, or belt, is heated, the support member to which the toner images are electrostatically adhered is moved through a "nip" formed between the members with the toner image pressure contacting the fuser member. Thus the toner images are heated within the nip. By controlling the heat transfer from the fuser member surface to the toner such that the surface temperature does not rise above the "hot offset" temperature at which the toner particles in the image areas liquefy, virtually no offset of the toner particles from the support (e.g., a copy sheet) to the fuser member is experienced under normal conditions. If the toner melts due to exceeding the hot offset temperature to an extent that the cohesive forces holding the viscous toner mass together are less than the adhesive forces tending to adhere the mass to a contacting surface such as a fuser roll, fuser belt, or fuser plate, the toner is prone to split and offset to such surface.

Occasionally, however, toner particles will be "cold offset" to the fuser roll, that is, when the surface temperature is below the "hot offset" temperature. Some reasons for cold offsetting are imperfection in the properties of the surface of the roll, insufficient adherence of the toner particles to the copy sheet, insufficient strength of the electrostatic forces which normally hold toner particles to the copy sheet, and, in certain cases, the reactivity of the toner material itself. In such a case, toner particles may be transferred to the surface of the fuser member with subsequent transfer to the backup member which provides pressure contact during the period of time when no copy paper is in the nip.

It is known in the art that undesirable offsetting of the toner from the support can be effectively prevented during toner fusing operations by interposing a barrier layer of a heat and toner adhesion resistant material between the fuser member and the support. In many of these pressure contact, heat fixing systems, the fuser member is a metal fuser roll and the barrier layer is applied as a covering on the outer surface of this fuser roll. As an example of the heat resistant, release material for the fuser roll, there are well known materials such as polytetrafluoroethylene, silicone rubber, fluorocarbon elastomers and the like.

Perfluorinated polymer compositions are preferred for the heat resistant fuser roll covering largely because they exhibit superior low adhesion to toner. Unfortunately, this "nonstick" property also makes such polymers difficult to durably adhere to the metal which usually forms the core of the covered fuser roll.

The conventional method of putting a coating of the preferred, toner adhesion resistant polymers onto a metal fuser roll core involves providing the polymer in fine particle size. The polymer is either dispersed or dissolved in an appropriate medium to form a fluid that usually includes additional adhesive components. The fluid is sprayed onto the core and the adhesive components are cured to form a bond between the metal and the polymer. To apply a coating of a highly fluorinated polymer, which is a much desired type, it had been found that adhesion to a metal substrate is promoted by first etching the polymer and then utilizing adhesives, among other steps. Etching compositions for fluorocarbon polymers are described in such patents as U.S. Pat. Nos. 2,789,063 and 2,809,130.

Fuser rolls having a fluorinated polymer cover affixed by etching and adhesives and the process for making such rolls suffer from several drawbacks. One limitation is that the bonds produced by the adhesive after etching often cannot withstand the high temperatures of electrophotographic processing. Consequently, the heat resistant fluorocarbon barrier layer soon peels off or becomes so loosened from the surface of the metal core as to be rendered prematurely useless. Other problems arise from handling the fluorocarbon polymer as a powder dispersed in a fluid medium. Such problems often relate to the need to properly proportion the polymer and other ingredients, the need to protect against potential hazards and waste caused by spills of raw materials during processing, and the cost of providing, operating and maintaining equipment used to process and apply the coating fluid. It is especially problematic that the texture of the surface of a fuser roll with spray applied and adhesively bonded fluorinated polymer coating is too rough as directly produced for electrophotographic copying and like applications. To achieve the desired degree of smoothness, such a fuser roll normally is burnished by application of sufficient heat to soften the polymer for a duration effective to cause the microscale peaks and valleys to level.

U.S. Pat. No. 4,258,089 provided a method of applying fluorinated polymer to a metal fuser roll surface that sought to overcome these drawbacks by eliminating the use of etchant and additional adhesive material altogether. Generally, this method called for first cleaning the surface of the substrate and next heating the substrate to a temperature high enough that the polymer to be coated thereon softens, melts or gels. The polymer is contacted with the substrate, and then pressure contact between the polymer and substrate can be applied with force effective to form a bond. The polymer could be to a roller in tube form. In such a case, the polymer tube could be heated prior to applying the pressure contact.

The method of the '089 patent goes a long way toward improving the art of coating a metal fuser roll with a fluorocarbon polymer. However, the apparatus disclosed to coat fuser rolls is difficult to implement with high productivity. The '089 patent suggests heating the roll to be coated by a heating element inserted inside the roll and applying the bonding pressure with a second roll rotating in contact with the coated roll. The second roll is continuously cooled so that the coating does not transfer onto it from the fuser roll intended to be coated.

It is desirable to have a method of coating metal core fuser rolls with toner adhesion-resistant fluorinated polymer that overcomes the disadvantages mentioned above. That is, it would be welcome to have a coating method that provides a permanent bond between the polymer and the metal core without utilizing etchants or additional adhesives. Further, it is wanted to affix a fluorinated polymer coating without spraying a powder dispersed in a fluid medium so as to provide ease and simplicity of processing and production of suitably smooth surface coatings without having to resort to post process burnishing. It is also desired to have a method that avoids application of external force to press the polymer against the core while the coating is affixed thereto.

Accordingly, the present invention now provides a method of making a fuser roll comprising the steps of (a) providing a cylindrical core having a core outer diameter, (b) providing a slightly expandable, cylindrical fluorinated polymer sleeve having a sleeve inner diameter smaller than the core outer diameter, the fluorinated polymer having a thermoplastic softening temperature, (c) inserting the core into the fluorinated polymer sleeve to form an unbonded assembly, (d) while maintaining temperature below the thermoplastic softening temperature, subjecting the unbonded assembly to a subatmospheric pressure for a duration effective to remove substantially all gaseous components from between the core and sleeve, (e) while maintaining the unbonded assembly at the subatmospheric pressure, heating the unbonded assembly to an elevated temperature above the thermoplastic softening temperature for a duration effective to fuse the fluorinated polymer to the core, and (f) cooling the assembly to a temperature below the thermoplastic softening temperature, thereby affixing the fluorinated polymer to the core with a bond.

BRIEF DESCRIPTION OF THE DRAWINGS

FIG. 3C is an elevation view of the installation apparatus of FIG. 3B showing the core fully inserted into the sleeve.

FIG. 3D is an elevation view of the installation apparatus of FIG. 3C showing the sleeve and core detached from the installation apparatus.

DETAILED DESCRIPTION

Figure 1:
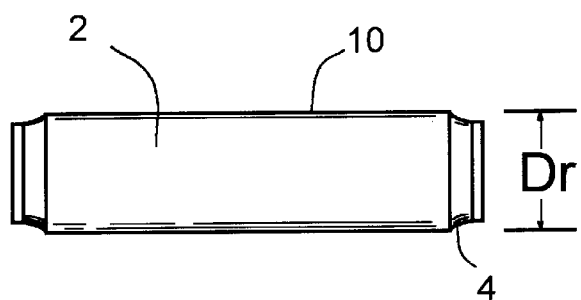
FIG. 1 is side view of a core to be coated according to the method of this invention for use as a fuser roll of an electrophotographic copying machine.

In a broad sense, this invention is a method of producing an article having a core with a metal surface and a thin layer of fluorinated polymer thermally bonded to the metal surface without etching the surface or utilizing additional adhesive components. This method relies on providing the fluorinated polymer in the form of a thin-walled sleeve. Very basically, the core is inserted into the sleeve, which is suitably sized so that the fluorinated polymer contacts the area of the metal surface to be covered. Then the assembly is placed in vacuum, and after an appropriate time the temperature is raised above the fusion point of the fluorinated polymer while maintaining the vacuum. The fluorinated polymer thus softens and liquefies at the interface between the metal surface and the sleeve. The temperature is next lowered below the fusion point which causes the fluorinated polymer to re-solidify and become permanently thermally bonded to the core.

The preferred utility for the novel method is the production of fuser rolls in the modem electrophotographic copying industry. These fuser rolls are typically used in xerographic, electrostatic and so-called "laser" printers, copiers and similar graphic reproduction devices (hereinafter collectively "electrophotographic copying machine" or "EC machine"). In this field, it is common for the fuser roll core to be a hollow aluminum cylinder. More specifically, such fuser roll cores are cylindrical in that the operative outer surface, i.e., the portion in contact with the toner image, has a uniform diameter circular cross section perpendicular the axis of elongation along the entire length. The fuser roll can have extensions on one or more ends beyond the generally axially central, operative cylindrical section. These extensions, sometimes referred to as journal ends are adapted to mount the fuser roll in drive and/or support bearings of the EC machine. Usually the journal ends also have a circular cross section but are not necessarily cylindrical. For example, they may have full or partial tapers and step changes in diameter along the core axis of elongation. The shape of the journal ends is not critical except to the extent that at least one journal end must be suitably sized to permit the core to insert into the sleeve. This criterion is normally satisfied when the largest circumscribing diameter of one journal end is smaller than the diameter of the cylindrical portion of the core.

The preferred core is aluminum, presumably due to the optimum combination of abundance, raw material cost, heat transfer characteristics, ease of fabrication and low density of this material. The present invention is suitable for covering cores of other materials, provided that the core material is rigid and can withstand the thermal bonding procedure. Representative other metals which may be used include iron, nickel, titanium, magnesium, and alloys thereof and of aluminum.

When undergoing the process of this invention the core is usually exclusively constituted by a single metal composition. Composite cores, that is, those having radially central portions of a different composition than an annular outer surface composition can be used with the proviso about withstanding thermal processing noted above. Although the operative surface is preferably cylindrical, other elongated, uniform or nearly uniform cross section shaped cores can be covered by the novel method as well. For example, the core cross section can be of oval, triangular, square or rectangular, and other regular or irregular polygonal shape. It should be noted however that only the surface of the core that contacts the fluorinated polymer upon insertion of the core into the sleeve will become thermally bonded to the polymer. For successful operation of this invention it is not critical that the operative portion of the core be absolutely cylindrical within a narrow tolerance, although fuser roll cores for EC machines generally do have such dimensional requirements. Depending upon the elasticity of the fluorinated polymer sleeve, some stretching during core insertion can be tolerated. Therefore, slight taper (i.e., conical) or slight convex or concave axial core curvature can sometimes be accommodated. One of ordinary skill in the art should be able to apply the teaching of this disclosure to determine the bounds of axial curvature that may be tolerated by the novel procedure without undue experimentation.

The fluorinated polymer for use in this invention is selected to be toner adhesive resistant during normal operation of the polymer covered core. As alluded to above, this means that the polymer composition exhibits the desired degree of incompatibility with the toner that toner split and offsetting is effectively prevented by the presence of the polymer cover. The fluorinated polymer also should be stable up to normal EC machine operating temperatures. Furthermore, the fluorinated polymer should be melt processable as called for by this invention. That is, a suitable polymer will soften and ultimately melt and flow as a viscous liquid on heating and then will resolidify on cooling. This thermoplastic behavior results in the polymer being firmly adhered to the metal surface of the core. It is of course additionally important that the polymer have the ability to be formed into a thin walled sleeve, preferably by conventional blown film extrusion unit operations which are well known in the art.

Fluorinated polymer compositions suitable for covering EC machine fuser rolls are well known in the art. They are highly fluorine substituted hydrocarbon and hydrohalocarbon polymers and copolymers. Preferred compositions include perfluoroalkoxy polymers and fluorinated olefin copolymers. Representative examples of perfluoroalkoxy polymers, occasionally referred to as "PFA" polymer or poly-perfluoroalkylvinyl ether, include poly-perfluoropropylvinyl and poly-perfluoromethylvinyl ether. Especially preferred are copolymers of tetrafluoroethylene ("TFE") and perfluoroalkylvinyl ether, such as poly-TFE/perflouropropylvinyl ether and poly-TFE/perfluoromethylvinyl ether which are available commercially under the tradenames Teflon® PFA and Kalrez® (DuPont, Wilmington, Del., respectively. Among fluorinated olefin polymers are ethylene/TFE copolymers often referred to as "ETFE", and ethylene-propylene copolymers, sometimes referred to as "FEP" polymer. Poly-TFE/hexafluoropropylene is a greatly preferred FEP polymer. This material is commercially available under the tradename Teflon® FEP (DuPont, Wilmington, Del.).

The fluorinated polymer is provided for use according to this invention in the form of a thin walled sleeve. Wall thickness is not critical, however, the fluorinated polymer is usually an expensive raw material and only the minimum amount of polymer necessary to cover the metal so as to provide toner adhesion resistance is sufficient. Therefore, it is desired for many product applications to make the wall of the sleeve as thin as practical. Naturally, if the wall is too thin, it will not stand up to handling and core insertion steps. If the sleeve wall is too thick it can act as a thermal barrier during the thermal bonding step. This can prevent the polymer at the metal surface from softening before the outer regions of the sleeve have melted and perhaps flowed and distorted the outer surface of the sleeve. Generally, it has been found that the sleeve wall thickness should be about 25–380 $\mu$m (1–15 mil), preferably about 25–130 $\mu$m (1–5 mil) and more preferably about 25 $\mu$m (1 mil). The sleeve wall should be uniformly thick and the outer sleeve surface should be smooth on a macro scale (i.e. $\mu$m). Although the thermal bonding step of this novel method is primarily directed to adhering the polymer to the metal core, it also conveniently provides an in-situ burnishing effect. This tends to smooth the outer surface of the polymer and renders it ideal for use without resort to a post process burnishing step required of conventionally produced EC machine fuser rolls. Thin wall tubing of highly fluorinated, melt processable polymer suitable for use in this invention is available commercially under the tradename Microwall® (Saint-Gobain Performance Plastics, Mickleton, N.J.).

As mentioned, the novel method calls for inserting the core into the sleeve. Because the core surface to be covered will be in contact with the fluorinated polymer prior to the thermal bonding step the core and sleeve should mate with a smooth, "skin-tight" fit. A sleeve of composition and wall thickness just described will be slightly expandable. By "slightly expandable" is meant that given a sleeve characterized by a diameter such that the inner circumference of the sleeve is slightly smaller than the outer perimeter of the core, the walls of a sleeve can stretch over and conform closely to the core without tearing the sleeve. If the sleeve diameter is too small, however, the core will resist sliding completely into the sleeve and the sleeve can break during insertion. Preferably the inner circumference of the sleeve should be smaller than the outer perimeter of the core by less than about 10%, more preferably, by less than about 5%, and most preferably by less than about 2%. Exact relative dimensions of the sleeve and the core can be determined on a case by case basis without undue experimentation by one of ordinary skill in the art taking into account the teaching of this disclosure.

The sleeve can be produced by conventional blown film extrusion procedures. This unit operation basically involves continuous melting of a polymer and extrusion through an annular slit die to form a molten tube. The tube is axially drawn while hot air injected within the tube forms a bubble to expand the film radially. Jets of cooling air are blown against the outside of the drawn film. As the film cools below its melting point, it is drawn between opposing flat surfaces which collapse the bubble. The continuous tube is usually further flattened between compression rolls and wound on a spool.

Figure 2:
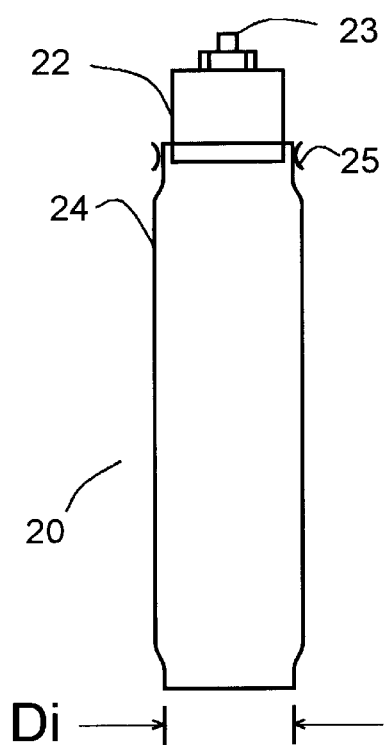
FIG. 2 is an elevation view of an installation apparatus for inserting a fuser roll core into a sleeve of fluorinated polymer according to this invention.

A method of inserting a core into a sleeve in preparation for carrying out the thermal bonding steps of this invention can be understood with reference to FIGS. 1–3. FIG. 1 shows a typical metal fuser roll core 10. This core has a cylindrical operative surface 2 with an outer diameter Dr. The core has two identical journal ends 4 that taper to smaller diameter than Dr. FIG. 2 shows a cylindrical installation apparatus 20 adapted to facilitate insertion of the core into a sleeve. The installation apparatus includes a head 22 which is fitted with a pneumatic air supply connector 23. The connector is adapted to engage an appropriate fitting on a compressed air supply transfer line as will be explained. A channel (not shown) within the head 22 conducts the compressed air into the chamber defined by cuff 24. The latter is a rigid or semi-rigid hollow body having an axially central diameter. Preferably the insertion process is operated with the installation apparatus oriented vertically as shown in the figures. The bottom end of the cuff is open and is shown with an optional inwardly directed neck flange. The inner diameter of the flange has a diameter Di which is slightly larger than Dr so as to permit the core to easily enter the chamber. Preferably Di is large enough that the core can enter the chamber without touching the body of the installation apparatus to reduce the likelihood that contact between core and body will occur to damage the surface of the core. The body 24 is affixed to head 22 by a conventional mechanical clamping or fastening means represented schematically by elements 25 (FIG. 2). Representative clamping or fastening means include hose clamps, wire, and tape. Clamp 25 is effective to produce a pressure tight seal between the body and head, although this feature is not readily apparent from the figures. Diverse variations of the installation apparatus different from the illustrated embodiment are contemplated to be equivalent and suitable for use. For example, although the body depicted is of a transparent rigid plastic material to provide a clear view of the core being inserted into the sleeve, an opaque metal body will suffice. Also, head and body can be of integral construction rather than joined by a fastener.

The first step of the insertion process is to temporarily close the opening of the hollow core at one journal end 4 with a gas impenetrable cover. This allows the core to act like a piston, as explained below. The cover can be effected by taping over the opening or applying a lid or screw cap on the journal end. The core is next fully inserted through the bottom opening of the cuff 24 so that it resides completely in the chamber. The cover can be applied to either journal end of the core, however the covered end is preferably introduced first into cuff and will be at the top of the core in its vertical orientation. This is because pressure will be applied from the top down in a subsequent step. A top cover pushing down on the core is more secure than a bottom cover pulling down which may blow off of the core if not properly secured.

Figure 3A:
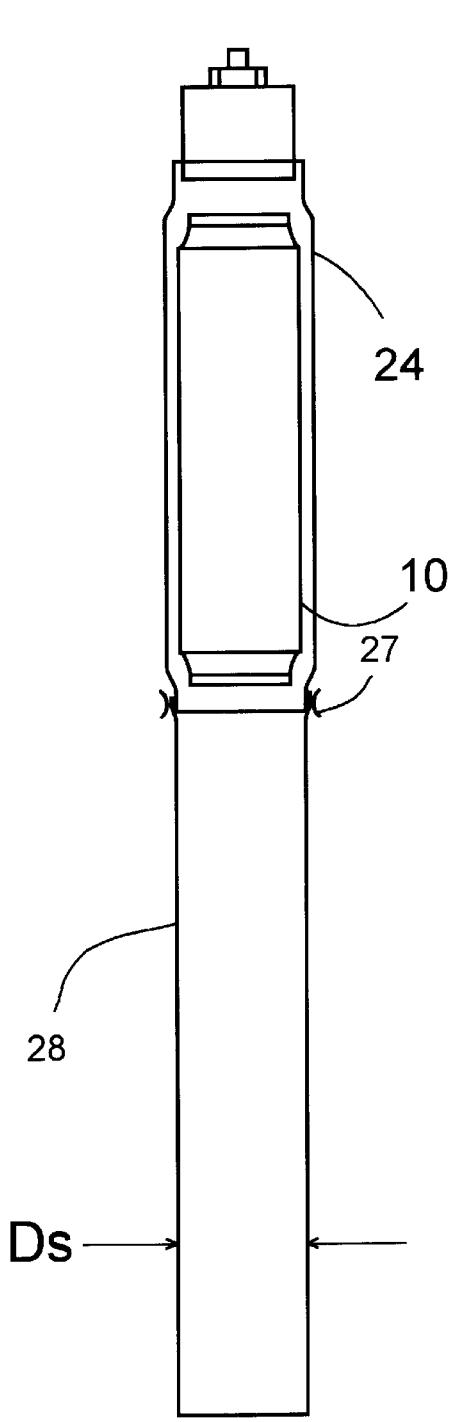
FIG. 3A is an elevation view of the installation apparatus of FIG. 2 showing the core in position for insertion into the sleeve mounted below the installation apparatus.

With the core lodged inside the chamber, a length of fluorinated polymer sleeve 28 is mounted on the bottom of the cuff as seen in FIG. 3A. The diameter of the sleeve Ds is slightly less than the core diameter Dr. Therefore it is important to flare a short section of the end of the sleeve to be placed on the cuff. Flaring can be accomplished by forcing a frustoconical object of appropriately tapered diameter into the sleeve end causing the sleeve walls to stretch. Care should be exercised to prevent tearing of the sleeve. The optional neck at the bottom of the cuff facilitates mounting the flared end of the sleeve. The core can be maintained within the chamber, for example, with a slender rod (not shown) of suitable length and having a forked upper end pushed upward from below to engage the lip of the bottom journal end. The sleeve can then be slipped over the rod and lapped over the bottom of the cuff. Thereafter, the sleeve 28 is removably clamped over the bottom of the cuff 24 my mechanism schematically represented by element 27. This clamping mechanism is adapted to provide a pressure tight fit between sleeve and cuff. With the sleeve firmly clamped, the rod can be carefully withdrawn so as to allow the core to gently move down toward the sleeve. Due to the difference in core and sleeve diameters, the core should settle with its bottom journal end extending very slightly into the upper end of the sleeve. This points to another potential limitation on the structure of the sleeve, specifically, that it should be structurally strong enough to support the weight of the core at this stage of the insertion process and later as pressure is applied.

Figure 3B:
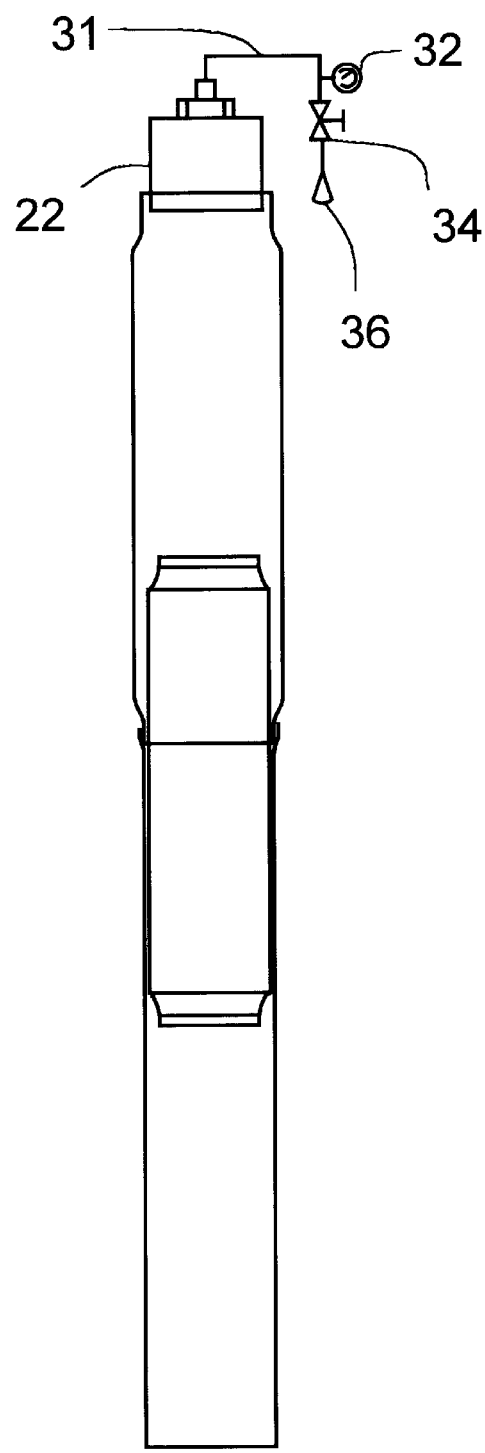
FIG. 3B is an elevation view of the installation apparatus of FIG. 3A showing the core partially inserted into the sleeve.

In the next steps, a pneumatic air supply transfer line 31 (FIG. 3B) is mated to connector 23 on head 22. This line is supplied by a source 36 of compressed gas, preferably air. Preferably the line includes a throttle valve 34 to manually or automatically regulate pressure of the air at the head, as indicated by gage 32. Gas introduced through the supply line enters the chamber within the body above the closed end of the core. It is restricted from escaping through the bottom of the cuff by the tightness of fit between the core and sleeve. Consequently, the closed end of the core acts like a piston head resulting in the gas pressure forcing the core downward into the sleeve as seen in FIG. 3B. The pressure is adjusted so as to gradually lower the core. Typically about 30–170 KPa gage (5–25 psig) is effective to push a 2.5–5 cm diameter aluminum core into the sleeve.

Application of pressure is continued until, as seen in FIG. 3C, the core has descended to an extent that at least the whole surface 2 is within the sleeve. Air supply should be valved off or diverted thereby stopping descent before the core begins to extrude from the open, bottom end of the sleeve. Then the sleeve with core within can be dislodged from the installation apparatus. Excess sleeve extending beyond the ends of the cylindrical surface 2 of the core can be trimmed, for example by cutting with a knife edge thus rendering the core ready for subsequent thermal bonding steps to begin.

When the sleeve is properly mounted on the core, the thermal bonding procedure can commence. The basic elements of this procedure include subjecting the assembled sleeve and core to a vacuum, maintaining the vacuum while heating the assembly to a temperature above the polymer softening point, allowing the polymer to flow onto the metal surface at a micro scale (i.e. <<1 $\mu$m) and cooling the assembly to resolidify and bond the polymer firmly to the core.

It has been discovered that this sequence of events is very important to follow to obtain a satisfactory quality product. Without wishing to be bound to any particular theory, it is thought that trace amount of air and possibly free, normally negligibly volatile components dissolved in the polymer exist and are trapped between the sleeve and the core. If not first removed, they vaporize due to application of heat for thermal bonding and form blisters when the core is cooled. The purpose of the vacuum step is to extract any entrained air and other potentially blister forming species before the polymer reaches its softening point. These components are thought to diffuse through the sleeve wall to the outer surface of the sleeve due to the driving force of the applied vacuum. They are then drawn away by the vacuum. The diffusion and withdrawal can be accelerated somewhat by applying heat to the assembled core within sleeve, provided that the temperature of the assembly is kept far enough below the polymer softening point that the trapped air and free components create bubbles in the sleeve.

The vacuum and temperature below the softening point are maintained for a duration effective to remove air and other free components which might cause blisters. Generally, the vacuum should be pulled to as low a pressure as possible. Any conventional vacuum pump of suitable capacity and suction power can be used. Preferably, the pressure should be reduced and maintained at less than 1 mm Hg, and more preferably below 1 $\mu$m Hg at room temperature for at least 20 minutes. Additionally, preference is given to heating the assembled sleeve and core to a maximum of 30° C. degrees below the polymer softening point during this pre-conditioning stage of the process. Ideally, the process can be carried out in a conventional vacuum oven. The pre-conditioning stage can be optionally further improved by devolatilizing the sleeve in advance of inserting the core into the sleeve. That is, a stock of sleeve can be placed in a chamber at subatmospheric pressure, slightly elevated temperature below the polymer softening point, or both well before it is to be mounted onto a core. While this will not prevent air from subsequently becoming trapped between sleeve and core, it will provide the opportunity for any free components, moisture and the like to vacate the sleeve when there is ample time to achieve this objective.

Once the pre-conditioning stage at vacuum and optional subsoftening point heating has been done, the thermal bonding steps can be completed. While maintaining the sleeve and core assembly under vacuum, more heat is applied to raise the temperature above the softening point. The temperature should not be raised so high that the fluorinated polymer becomes a low viscosity, freely flowing liquid. As mentioned, preferably only enough heat should be applied to fuse the polymer at its interface with the metal core. Preferably, the temperature should be raised up to about 10° C. above the polymer softening point.

It has been noted that the novel method of making fuser rolls provides the advantage of eliminating the need for the fabricator to handle powders and polymer solutions. This invention also features the ability to be adapted for full or nearly completely automatic operation at high speed and low involvement of labor. For example, it is contemplated that the operation of inserting cores into polymer tubes can be readily automated by suitably designing parts handling machines. It is also envisioned that the thermal bonding steps can be carried out in vacuum ovens adapted with automatically controlled load lock entrance and exit chambers. With such equipment, sleeved cores could be admitted and discharged continuously with minimal direct operator attention. These advantages should allow the manufacture of fuser rolls in this very commercially important industry at high productivity and low production cost.

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

A hollow aluminum fuser roll core having a 30 mm outer diameter (Dr) and 300 mm long cylindrical portion disposed axially centrally between two tapered journal ends, substantially as shown in FIG. 1 was inserted into a 29 inner diameter sleeve of PFA polymer by the method described above and shown in FIGS. 3A–3D. Wall thickness of the sleeve was 25 $\mu$m. The ends of the sleeve extending outboard of the core were trimmed and clamped with wire to the journal ends. The core and sleeve was placed inside a section of straight metal pipe with care to prevent contacting the core with the pipe. The cylindrical portion of the core to be coated was kept away from the inner wall of the pipe by washers adapted to fit in the annular space between the outer diameter of the journal ends and the pipe wall. The ends of the pipe section were closed with end caps to effect airtight seals. One cap was equipped with an adapter for connecting tubing to the chamber within the pipe. The sealed pipe was placed inside a conventional (i.e., atmospheric pressure) oven and the tubing adapter was connected to an external vacuum pump. With the oven at 20° C., vacuum was pulled on the inside of the pipe for 20 minutes. Thereafter the temperature of the oven was increased to 340° C. and maintained for three hours. The temperature was lowered to room temperature, vacuum removed and the coated core was withdrawn from the pipe. This process was repeated with a 40 mm outer diameter aluminum fuser roller core except that the bonding temperature was 330° C. and was imposed for eight hours before removing the core from the pipe. Visible inspection indicated that the sleeve had bonded smoothly and uniformly to the core with no air bubbles visible under the polymer coating. Also excellent adhesion was found by peel delamination tests on each coated core.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of making a fluorinated polymer coated core comprising the steps of
   (a) providing a core having a smooth surface free of protrusions and depressions defining a core outer perimeter,
   (b) providing a slightly expandable, fluorinated polymer sleeve having a sleeve inner circumference smaller than the core outer perimeter, the fluorinated polymer having a themoplastic softening temperature,
   (c) inserting the core into the fluorinated polymer sleeve to form an unbonded assembly,
   (d) while maintaining temperature below the thermoplastic softening temperature, subjecting the unbonded assembly to a subatmospheric pressure for a duration effective to remove substantially all gaseous components from between the core and sleeve,
   (e) while maintaining the unbonded assembly at the subatmospheric pressure, heating the unbonded assembly to an elevated temperature above the thermoplastic softening temperature for a duration effective to fuse the fluorinated polymer to the core, and
   (f) cooling the assembly to a temperature below the thermoplastic softening temperature, thereby affixing the fluorinated polymer to the core with a bond,
   in which the inserting step comprises
      (i) providing an installation apparatus having a rigid hollow body defining a pressure tight chamber adapted to slidably receive the core at one chamber end without contacting the surface of the core,
      (ii) inserting a core into the chamber through the one chamber end,
      (iii) mounting an end of the sleeve onto the one chamber end with a pressure tight seal between the sleeve and body, and
      (iv) introducing compressed gas into the chamber so as to push the core through the chamber end into the sleeve.

2. The method of claim 1 in which the bond is substantially free of any foreign adhesive component.

3. The method of claim 1 in which the fluorinated polymer is selected from the group consisting of fluorinated olefin polymer, perfluoroalkoxy polymer, and a mixture thereof.

4. The method of claim 3 in which the core has a surface at the outer perimeter comprising aluminum.

5. The method of claim 4 in which the core consists essentially of aluminum.

6. The method of claim 5 in which the core is a hollow cylindrical fuser roll core for an electrophotographic copying machine.

7. The method of claim 4 in which the fluorinated polymer consists essentially of fluorinated ethylene/propylene copolymer.

8. The method of claim 4 in which the fluorinated polymer consists essentially of ethylene/tetrafluoroethylene copolymer.

9. The method of claim 4 in which the fluorinated polymer consists essentially of perfluoroalkoxy polymer selected from the group consisting of poly-perfluoropopylvinyl ether, poly-perfluoromethylvinyl ether, poly-TFE/perflouropropylvinyl ether, poly-TFE/perflouromethylvinyl ether and mixtures thereof.

10. The method of claim 9 in which the fluorinated polymer consists essentially of poly-TFE/perfluoromethylvinyl ether.

11. The method of claim 1 in which step (d) of subjecting the unbonded assembly to a subatmospheric pressure further comprises raising the temperature of the assembly above ambient atmospheric temperature.

12. The method of claim 1 in which the core is a hollow cylinder and the method further comprises covering at least one end of the core with a pressure tight seal prior to inserting the core into the chamber.

13. The method of claim 1 in which the sleeve inner circumference is less than 10% smaller than the core outer perimeter.

14. The method of claim 1 in which the sleeve has a wall thickness of about 25–380 $\mu$m.

15. The method of claim 1 in which step (d) comprises placing the unbonded assembly in a chamber and reducing the pressure in the chamber to the subatmospheric pressure.

* * * * *

UNITED STATES PATENT AND TRADEMARK OFFICE
CERTIFICATE OF CORRECTION

PATENT NO. : 6,602,368 B2
DATED : August 5, 2003
INVENTOR(S) : Martin Geiger

It is certified that error appears in the above-identified patent and that said Letters Patent is hereby corrected as shown below:

<u>Column 11,</u>
Line 19, delete "poly-perfluoropopylvinyl ether," and substitute -- poly-perfluoropropylvinyl ether -- therefor.

Signed and Sealed this

Seventh Day of October, 2003

JAMES E. ROGAN
*Director of the United States Patent and Trademark Office*